US008731810B2

(12) United States Patent
Conway

(10) Patent No.: US 8,731,810 B2
(45) Date of Patent: May 20, 2014

(54) AIRCRAFT PATH CONFORMANCE MONITORING

(75) Inventor: Sheila R. Conway, Seattle, WA (US)

(73) Assignee: The Boeing Company, Chicago, IL (US)

( * ) Notice: Subject to any disclaimer, the term of this patent is extended or adjusted under 35 U.S.C. 154(b) by 762 days.

(21) Appl. No.: 12/965,312

(22) Filed: Dec. 10, 2010

(65) Prior Publication Data

US 2012/0150426 A1 Jun. 14, 2012

(51) Int. Cl.
*G06F 19/00* (2011.01)

(52) U.S. Cl.
USPC .......... 701/120

(58) Field of Classification Search
None
See application file for complete search history.

(56) References Cited

U.S. PATENT DOCUMENTS

| | | | | |
|---|---|---|---|---|
| 5,574,648 | A | 11/1996 | Pilley | |
| 7,576,695 | B2 | 8/2009 | Smith et al. | |
| 2002/0075171 | A1* | 6/2002 | Kuntman et al. | 340/961 |
| 2003/0060941 | A1 | 3/2003 | Griffith et al. | |
| 2003/0132860 | A1* | 7/2003 | Feyereisen et al. | 340/973 |
| 2012/0150426 | A1* | 6/2012 | Conway | 701/120 |
| 2012/0209457 | A1* | 8/2012 | Bushnell | 701/13 |

FOREIGN PATENT DOCUMENTS

| | | | |
|---|---|---|---|
| EP | 2000777 | A2 | 12/2008 |
| WO | 2009025907 | A2 | 2/2009 |

OTHER PUBLICATIONS

Arrival Procedures, Federal Aviation Administration—Aeronautical Information Manual—Official Guide to Basic Flight Information and ATC Procedures, Chapter 5, Section 4, Feb. 11, 2010 (69 pgs).

Automated Radar Terminal System (ARTS), Federal Aviation Administration, http://www.faa.gov/air_traffic/technology/tamr/arts, Jun. 29, 2009, (1 pg).

Standard Terminal Automation Replacement System (STARS), Federal Aviation Administration, http://www.faa.gov/air_traffic/technology/tamr/stars/, Jun. 29, 2009, (1 pg).

International Search Report and Written Opinion; International Application No. PCT/US2011/053112; European Patent Office; Dec. 15, 2011.

* cited by examiner

*Primary Examiner* — Thomas Tarcza
*Assistant Examiner* — Adam Alharbi
(74) *Attorney, Agent, or Firm* — Toler Law Group, PC

(57) ABSTRACT

A particular method includes receiving aircraft state data associated with an aircraft at an air traffic control system. The aircraft state data includes a detected position of the aircraft, a velocity of the aircraft and an orientation of the aircraft. The method also includes predicting at least one future position of the aircraft based on the aircraft state data. The method further includes generating an alert in response to comparing the predicted future position to an air traffic navigation constraint assigned to the aircraft.

20 Claims, 7 Drawing Sheets

AIRCRAFT PATH CONFORMANCE MONITORING

FIELD OF THE DISCLOSURE

The present disclosure is generally related to aircraft path conformance monitoring.

BACKGROUND

Certain air traffic control schemes rely on path conformance. For example, an air traffic controller may assign a flight path to an aircraft. The flight path may be selected to avoid potential conflicts (e.g., with other aircraft). The aircraft may be expected to stay on the flight path to within particular navigation parameters. For example, the aircraft may be expected to maintain the flight path within Required Navigation Performance (RNP) values. The RNP value defines a volume of airspace or "tunnel" around the flight path that may be referred to as the RNP path. The aircraft is expected to stay contained within the boundaries of the RNP path.

The air traffic controller may be responsible to monitor the aircraft to ensure that the aircraft conforms to the RNP path. For example, the air traffic controller may be provided with a high-refresh-rate radar display. The radar display may show a most recent position of the aircraft based on radar return information. Additionally, the radar display may show a previous position of the aircraft. Thus, the radar display may indicate whether the aircraft is currently conforming to the RNP path. To estimate whether the aircraft is expected to conform to the RNP path at a future time, the air traffic controller may mentally extrapolate a subsequent position of the aircraft based on the previous position and the most recent position. Alternately, the controller's automation may provide this extrapolated position for them.

SUMMARY

Systems and methods to monitor aircraft path conformance are disclosed. A particular method may monitor an aircraft's compliance with a Required Navigation Performance (RNP) path. The method may predict the aircraft's position to anticipate deviations from the RNP path. The method may generate alerts in response to detected or predicted deviations from the RNP path. A future position of the aircraft may be predicted using aircraft state data, such as position, velocity vector, and aircraft roll angle, provided over a data link between the aircraft and a ground station. For example, a 1090 Mhz Enhanced Surveillance (EHS) data link may be used to provide the aircraft state data. The future position of the aircraft may also be predicted using information about the aircraft, such as estimated performance capabilities of the aircraft. A display provided to an air traffic controller may show the predicted future position of the aircraft in addition to one or more detected positions of the aircraft.

In a particular embodiment, a method includes receiving aircraft state data associated with an aircraft at an air traffic control system. The aircraft state data includes a detected position of the aircraft, a velocity of the aircraft, the roll angle of the aircraft, and an orientation of the aircraft. The method also includes predicting at least one future position of the aircraft based on the aircraft state data. The method further includes generating an alert in response to comparing the predicted future position to an air traffic navigation constraint assigned to the aircraft.

In a particular embodiment, a non-transitory computer-readable medium includes instructions that are executable by a processor to cause the processor to access an air traffic navigation constraint assigned to an aircraft. The instructions are further executable to cause the processor to access aircraft state data associated with the aircraft. The aircraft state data includes a detected position of the aircraft, a velocity of the aircraft, roll angle of the aircraft, and an orientation of the aircraft (e.g., a roll angle, a pitch angle, or a yaw angle). The instructions are further executable to cause the processor to predict at least one future position of the aircraft based on the aircraft state data. The instructions are further executable to cause the processor to generate an alert in response to comparing the predicted future position to the air traffic navigation constraint assigned to the aircraft.

In a particular embodiment, an air traffic control system includes a processor and a memory accessible to the processor. The memory stores instructions that are executable by the processor to cause the processor to access an air traffic navigation constraint assigned to an aircraft. The instructions are further executable to cause the processor to access aircraft state data associated with the aircraft. The aircraft state data includes a detected position of the aircraft, a velocity of the aircraft, and an orientation of the aircraft. The instructions are further executable to cause the processor to predict at least one future position of the aircraft based on the aircraft state data. The instructions are further executable to cause the processor to generate an alert when the future position violates the assigned air traffic navigation constraint.

The features, functions, and advantages that have been described can be achieved independently in various embodiments or may be combined in yet other embodiments, further details of which are disclosed with reference to the following description and drawings.

DETAILED DESCRIPTION

Figure 1:
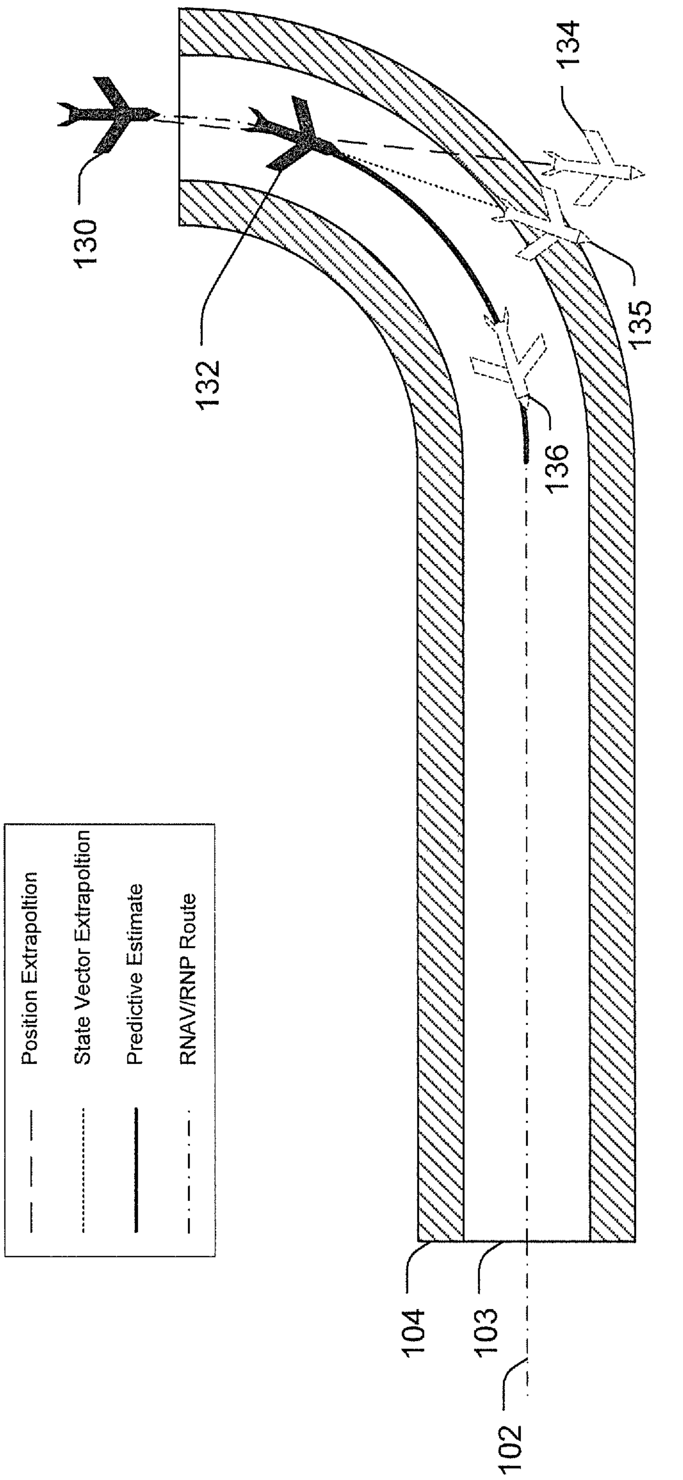
FIG. 1 is a diagram illustrating predicted paths of an aircraft.

Air traffic controllers may assign each aircraft under their control to a "tunnel" of space in which the aircraft is expected to remain. The tunnel or path may be specified as a Required Navigation Performance (RNP) path. The air traffic controllers may use a radar display of position information to monitor path conformance of each aircraft. The radar display, by its nature, displays information about a past position of an aircraft. For example, the radar display may provide information about where an aircraft was last detected (based on radar returns). Thus, by the time the aircraft is shown on the radar display, the aircraft has moved some amount. To account for this variation in the displayed position of the aircraft and an actual position of the aircraft, an amount of airspace assigned to the aircraft by an air traffic control system may be relatively large, which may lead to inefficiencies. For example, as an airport become busier, more aircraft may use airspace around the airport. Assigning large paths to each aircraft to account for position uncertainty may reduce a number of aircraft that are able to use the airspace around the airport due to over-crowding.

A number and availability of Area Navigation (RNAV) and RNP path-based clearances, such as Standard Instrument Departures (SIDS) and Standard Terminal Arrival Routes (STARS), at airports may be growing. However, separation standards used for these path-based clearances are not dependent on path conformance accuracy, path conformance repeatability, or path conformance predictability of aircraft. Therefore, paths may often be placed relative to paths for other aircraft in a manner that conforms with and ensures normal radar separation standards and that also overcompensate for both radar and navigation uncertainties, resulting in unnecessarily large clearance areas between paths.

Embodiments disclosed herein use a predicted position of the aircraft to alert air traffic controllers to expected or potential path conformance violations. For example, the aircraft's future position may be predicted based on the aircraft's detected position and aircraft state data, such as the aircraft's velocity and roll angle. The aircraft state data may be determined using a data link between the aircraft and a ground system, such as the air traffic control system. For example, an Enhanced Surveillance (EHS) data link may be used to provide the state data. The EHS data link may include an Automatic Dependent Surveillance-Broadcast (ADS-B) transmission, such as a 1090 MHz EHS link.

The state data may be used to improve path conformance prediction and to generate alerts for air traffic controllers when a path conformance violation is predicted (i.e., before the path conformance violation occurs). The state data may be used to project a future position of the aircraft. For example, if the aircraft is currently in an assigned tunnel, but has a high speed and a very steep bank angle, the next position may be predicted to be outside the tunnel. Information about the aircraft may also be used to predict the future position. For example, an estimated recovery time for the aircraft may be used to determine whether and when to alert an air traffic controller. The estimated recovery time may be determined based on performance characteristics of the aircraft. To illustrate, the estimated recovery time may be determined based on a roll rate characteristic, such as a maximum roll rate (i.e., a roll rate limit) associated with the aircraft. For example, in a particular circumstance, based on the anticipated roll rate of the aircraft (determined from the roll rate characteristics), the aircraft's speed, the aircraft's bank angle, and the aircraft's last detected position and heading, a calculation may be performed that indicates that the aircraft will violate an RNP-path even if the pilot takes corrective action immediately. Accordingly, an alert may be provided to the air traffic controller immediately based on the predicted future position of the aircraft. Thus, the air traffic controller may be alerted before the RNP-path violation occurs.

Using systems and methods disclosed herein, narrower, less conservative paths and air traffic navigation constraints may be used since future positions of aircraft may be predicted more quickly and more accurately using the aircraft state data. Thus, more efficient SIDS, STARS and other performance-based navigation (PBN) routes can be established and less conservative path-based separation standards may be used, resulting in improved air traffic services.

FIG. 1 is a diagram illustrating predicted paths of an aircraft. FIG. 1 illustrates positions of the aircraft detected at different times. For example, the detected positions of the aircraft include a first detected position 130 at which the aircraft was detected at a first time and a second detected position 132 at which the aircraft was detected at a second time subsequent to the first time.

FIG. 1 also shows an Area Navigation (RNAV)/Required Navigation Performance (RNP) plan 102 associated with the aircraft. The RNAV/RNP plan 102 may correspond to an intended or assigned flight path of the aircraft. The RNAV/RNP plan 102 may be determined based on information provided by the aircraft to an air traffic control system or an air traffic controller or may be assigned to the aircraft by the air traffic control system or the air traffic controller. The RNAV/RNP plan 102 may be bounded by air traffic navigation constraints 103, 104. As illustrated in FIG. 1, the air traffic navigation constraints 103, 104 may include a first air traffic navigation constraint 103 and a second air traffic navigation constraint 104. The aircraft may be expected to remain within the first air traffic navigation constraint 103 and an alert may be generated or other action may be taken if the aircraft passes outside the second air traffic navigation constraint 104. In a particular embodiment, the air traffic navigation constraints 103, 104 are specified by a Required Navigation Performance (RNP) value, an aircraft separation constraint, another constraint, or any combination thereof. For example, the first air traffic navigation constraint 103 may specify a distance that is one RNP value away from the RNAV/RNP plan 102 and the second air traffic navigation constraint 104 may be a distance that is two times the RNP value from the RNAV/RNP plan 102.

FIG. 1 illustrates predicted positions 134-136 of the aircraft at a future time. Each of the predicted positions 134-136 of FIG. 1 corresponds to the same future time; however, the predicted positions are determined using different estimation techniques. A first predicted position 134 may be estimated using position extrapolation. That is, the aircraft is assumed to move is a straight line that includes the first detected position 130 and the second detected position 132. Thus, the first predicted position 134 is on a line that extends through the first detected position 130 and the second detected position 132. Note that the position extrapolation technique used to determine the first predicted position 134 does not account for orientation of the aircraft. That is, when the aircraft is turning, as in FIG. 1, position extrapolation may predict that the aircraft will violate the air traffic navigation constraints 103, 104.

A second predicted position 135 may be estimated using state vector extrapolation. That is, the aircraft is assumed to continue to move along a direction indicated by an aircraft-reported state vector (i.e., direction and speed) of the aircraft when the determination is made. For example, when the aircraft is at the second detected position 132, the state vector of the aircraft includes a direction that is approximately tangent to a curve of the turn illustrated in FIG. 1. Thus, extrapolating the state vector leads to the second predicted position 135, which lies on a line that is tangent to the curve of the turn at a location of the second detected position 132.

A third predicted position 136 may be estimated using a particular embodiment of a method disclosed herein, referred to as predictive estimation in FIG. 1. The aircraft's position, velocity and orientation may be considered to estimate the third predicted position 136 using the predictive estimation technique. For example, at the second detected position 132, the aircraft is banked to begin the turn. Thus, the third predicted position 136 follows the curvature of the turn and has less error than the first predicted position 134 and the second predicted position 135.

In a particular embodiment, the third predicted position 136 may be calculated using aerodynamic information associated with the aircraft. For example, the third predicted position 136 may be calculated using information about performance capabilities of the aircraft (or a type of the aircraft), and state data, such as a velocity of the aircraft and a bank angle of aircraft. To illustrate, the state data and performance capabilities may be used to estimate a turning radius of the aircraft in order to approximate a flight path of the aircraft.

The aircraft may provide at least a portion of the state data to a ground station, such as the air traffic control system, to enable the ground station to determine the third predicted position 136. For example, that aircraft may transmit the state data periodically or occasionally via a data link, such as an Enhanced Surveillance (EHS) data link. The air traffic control system may be adapted to provide an alert to the air traffic controller when the aircraft is predicted to violate the air traffic navigation constraints 103, 104. Accordingly, fewer false alerts are expected when the air traffic control system uses the predictive estimation techniques disclosed herein, than if the air traffic control system uses the position extrapolation technique or the state vector extrapolation technique.

As illustrated by the first and second predicted positions 134, 135 of FIG. 1, curved paths can lead to inaccurate predictions of future positions when certain position estimation techniques (such as position extrapolation or state vector extrapolation) are used. However, using aircraft state data and the predictive estimation technique to estimate future positions of the aircraft can improve accuracy of the prediction in a curved path, which may reduce nuisance alerting.

Figure 2:
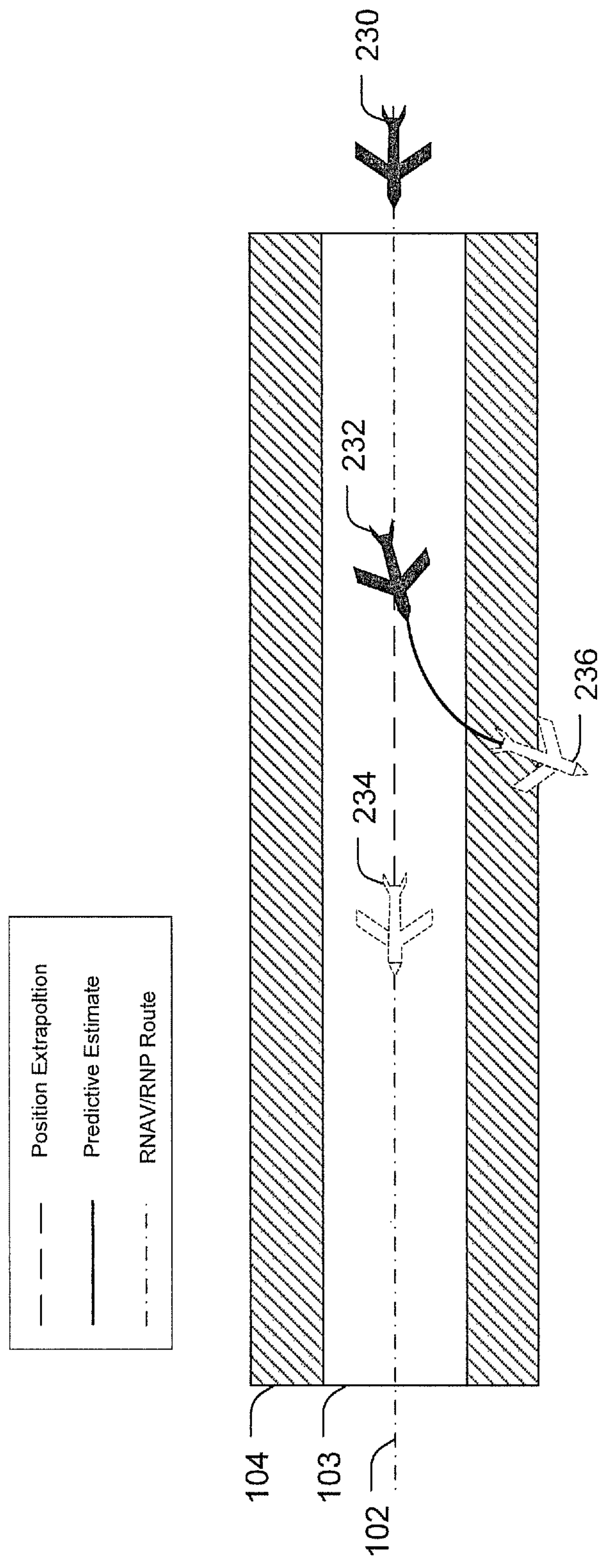
FIG. 2 is an additional diagram illustrating predicted paths of an aircraft.

FIG. 2 is another diagram illustrating predicted paths of an aircraft. In FIG. 2, two determined positions 230, 232 of an aircraft are shown, including a first detected position 230 at which the aircraft is located at a first time, and a second detected position 232 at which the aircraft is located at a second time. Two predicted positions are also shown, including a first predicted position 234 and a second predicted position 236. The predicted positions 234, 236 correspond to the same future time and are predicted using different techniques. As illustrated in FIG. 2, the RNAV/RNP plan 102 and the air traffic navigation constraints 103, 104 are approximately straight. At the first detected position 230 the aircraft is flying approximately level (i.e., no bank angle). At the second detected position 232, the aircraft is at a bank angle; however, for aerodynamic reasons, the aircraft has not started turning yet.

FIG. 2 illustrates one way in which predictions using a position extrapolation technique can cause delayed alerting. The first predicted position 234 is estimated using the position extrapolation technique. That is, a line between the first detected position 230 and the second detected position 232 is extrapolated to find the first predicted position 234. Using the position extrapolation technique, the aircraft is assumed to continue in a straight line. Accordingly, no alert is issued to indicate that the aircraft is predicted to violate the air traffic navigation constraints 103, 104.

The second predicted position 236 is estimated using the predictive estimation technique. That is, the position of the aircraft at the second detected position 232 and the state data of the aircraft at the second detected position 232 are used to estimate the second predicted position 236. Since the aircraft is banked at the second detected position 232, the predictive estimation technique may calculate a turn radius of the aircraft based on the state data. Thus, the second predicted position 236 may be predicted to violate the air traffic navigation constraints 103, 104 even while the aircraft is approximately on the RNAV/RNP plan 102.

Accordingly, using the predictive estimation technique, an air traffic controller may be alerted to a predicted violation of the air traffic navigation constraints 103, 104 at an earlier time than would be possible using position extrapolation. Note that in the circumstance illustrated in FIG. 2, the state vector extrapolation technique describe with reference to FIG. 1 also yields approximately the first predicted position 234 since the aircraft is banked but not yet turning at the second position 232. Accordingly, using the position extrapolation technique, the second detected position 232 may appear to be a minor cross-track error, and no alert to the air traffic controller may be generated. However, using the predictive estimation technique, the roll and instantaneous velocity state data indicates that a deviation from the air traffic navigation constraints 103, 104 will occur, and the air traffic controller is alerted.

Figure 3:
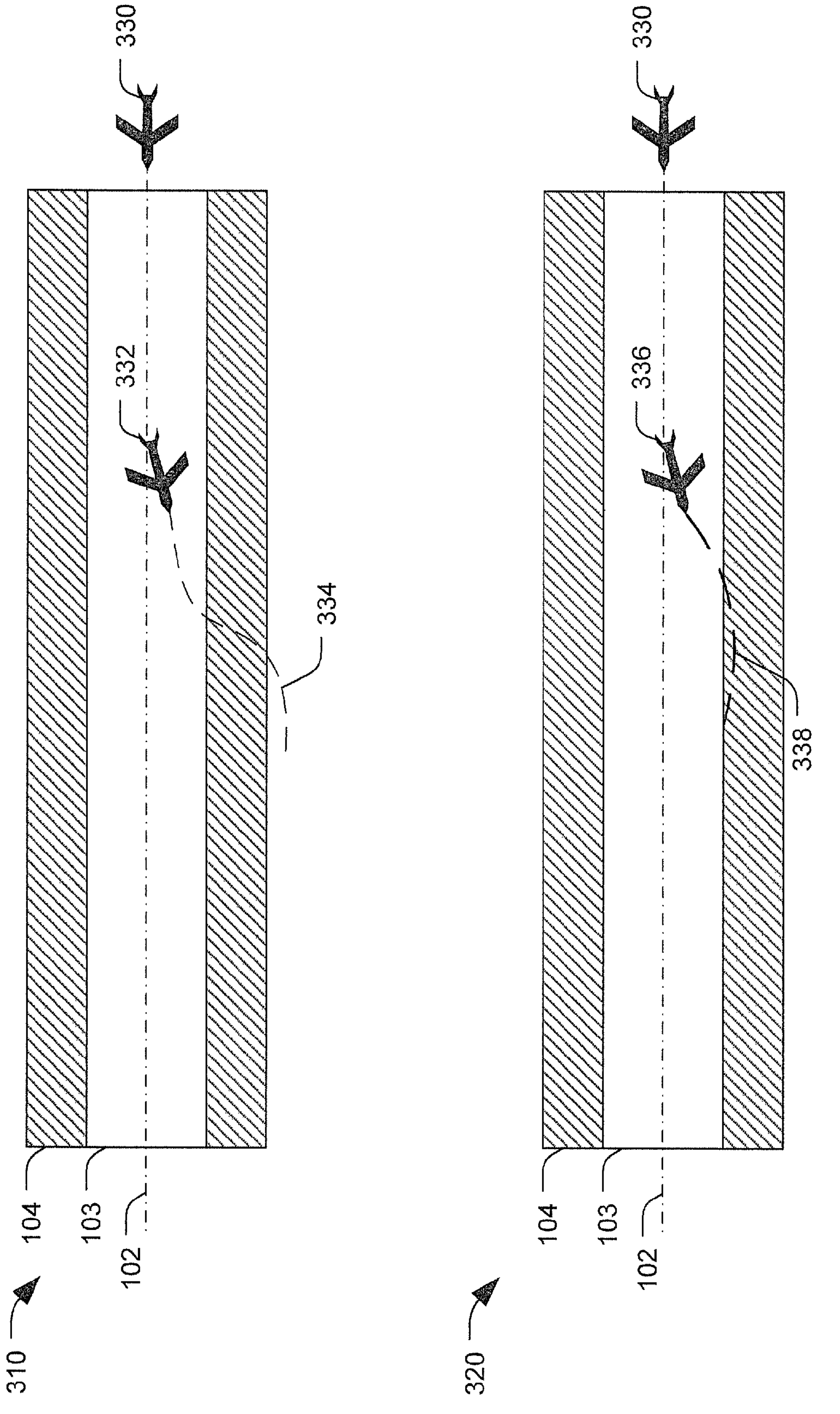
FIG. 3 is two additional diagrams illustrating predicted paths of an aircraft.

FIG. 3 includes two additional diagrams illustrating predicted paths of an aircraft. A first diagram 310 of FIG. 3 shows two determined positions 330, 332 of the aircraft, including a first detected position 330 at which the aircraft is located at a first time and a second detected position 332 at which the aircraft is located at a second time. At the second detected position 332, a heading of the aircraft is deviating from the RNAV/RNP path 102; however, the aircraft is within the air traffic navigation constraints 103, 104. The aircraft also has a steep left (from a pilot's perspective) roll angle at the second detected position 332.

The first diagram 310 of FIG. 3 also shows a first predicted future path 334 of the aircraft at a future time. The first predicted future path 334 may be determined based on aircraft state data reported by the aircraft at the second detected position 332. The first predicted future path 334 indicates that the aircraft is expected to violate the first air traffic navigation constraint 103 and the second air traffic navigation constraint 104. For example, although the heading of the aircraft has not deviated significantly from the RNAV/RNP path 102 at the second detected position 332, the steep left roll angle of the aircraft may indicate that the aircraft will deviate from the RNAV/RNP path 102 in the future. Additionally, the current state implies that even if a recovery maneuver was begun immediately, the aircraft would likely not remain within the air traffic navigation constraint 104.

A second diagram 320 of FIG. 3 illustrates a predicted future path 338 of the aircraft when the aircraft has initiated a correction maneuver at the second time. Thus, FIG. 3 shows two determined positions 330, 336 of the aircraft, including the first detected position 330 at which the aircraft is located at the first time and a correcting second detected position 336 at which the aircraft is located at the second time. At the correcting second detected position 336, the heading of the aircraft is deviating from the RNAV/RNP path 102. For example, the heading of the aircraft at the correcting second detected position 336 may be the same as or approximately the same as the heading of the aircraft at the second detected position 332 of the first diagram 310. Additionally, a location of the correcting second detected position 336 may be the same as or approximately the same as a location of the second detected position 332 of the first diagram 310. However, the correcting second detected position 336 and the second detected position 332 differ in that at the second detected position 332, the aircraft has a steep left roll angle; whereas, at the correcting second detected position 336, the aircraft has a correcting roll angle. In this context, a correcting roll angle refers to a roll angle that addresses the deviation from the RNAV/RNP path 102. For example, the correcting roll angle may be a right roll angle or a neutral roll angle.

The predicted future path 338 of the aircraft in the second diagram 320 does not violate the second air traffic navigation constraint 104. Rather, because the aircraft has already started a correcting maneuver, the aircraft is predicted to stay within the second air traffic navigation constraint 104 based on the aircraft's position (e.g., relative to the RNAV/RNP path 102) and aircraft state data (e.g., velocity, heading and roll angle).

In a particular embodiment, the predicted future paths 334, 338 may be determined by an air traffic control system based on aircraft state data provided by the aircraft. The air traffic control system may generate a display for an air traffic controller. The display may include the first detected position 330, the second detected position 332, or both. The display may also identify one or more predicted positions or predicted paths of the aircraft. For example, the display may include a predicted position of the aircraft along the first predicted future path 334 when the aircraft state data indicates that the aircraft has not initiated a correcting maneuver and may include a predicted position of the aircraft along the second predicted future path 338 when the aircraft state data indicates that the aircraft has initiated a correcting maneuver.

Additionally or in the alternative, the air traffic control system may generate an alert to an air traffic controller based on a probability that the aircraft will violate one or both of the air traffic navigation constraints 103, 104. For example, the probability that the aircraft will violate the air traffic navigation constraints 103, 104 may be estimated based on the aircraft state data and parameters associated with the aircraft, such as an estimated pilot recovery time, a roll rate limit, a roll angle limit, etc. When the aircraft has a high probability (e.g., greater than a threshold probability) of violating the air traffic navigation constraints 103, 104, the alert may be generated. Thus, the air traffic control system may enable generation of predictive alerts regarding potential violations of the air traffic navigation constraints 103, 104. For example, a first alert may be generated to indicate that the aircraft is predicted to violate the first air traffic navigation constraint 103, and a second alert may be generated to indicate that the aircraft is predicted to violate the second air traffic navigation constraint 104. In this example, the second alert may be selected to be more noticeable to the air traffic controller. For example, the first alert may be a visual alert and the second alert may include a visual alert and an audible alert. To illustrate, when the aircraft is predicted to violate the first air traffic navigation constraint 103, the display presented to the air traffic controller may be modified to indicate the violation. For example, an icon or other indicator associated with the aircraft may be highlighted in the display when the aircraft is predicted to violate the first air traffic navigation constraint 103. When the aircraft is predicted to violate the second air traffic navigation constraint 104, an audible alert and a modified icon or another indicator may be presented to the air traffic controller.

Accordingly, state data of the aircraft may be used to predict a future path of the aircraft. Predicting the future path of the aircraft may enable accurate, automated alerting of the air traffic controller before a violation of the air traffic navigation constraints occurs. Additionally, when a corrective action has not already been initiated, performance characteristics of the aircraft (such as roll rate characteristics) may be used to determine whether the aircraft can feasibly perform a maneuver to avoid violating the second air traffic navigation constraint 104.

The calculation of the predicted position may be associated with some uncertainty. Accordingly, statistical techniques may be used to estimate the uncertainty in the calculations. For example, the statistical techniques may be used to determine a probability that the aircraft will violate the first air traffic navigation constraint 103, the second air traffic navigation constraint 104, or both. A determination of whether to generate an alert may be made based on the probability that one of the air traffic navigation constraints 103, 104 will be violated. For example, when the probability that the aircraft will violate the second air traffic navigation constraint 104 satisfies a predetermined threshold value, an alert may be generated.

Figure 4:
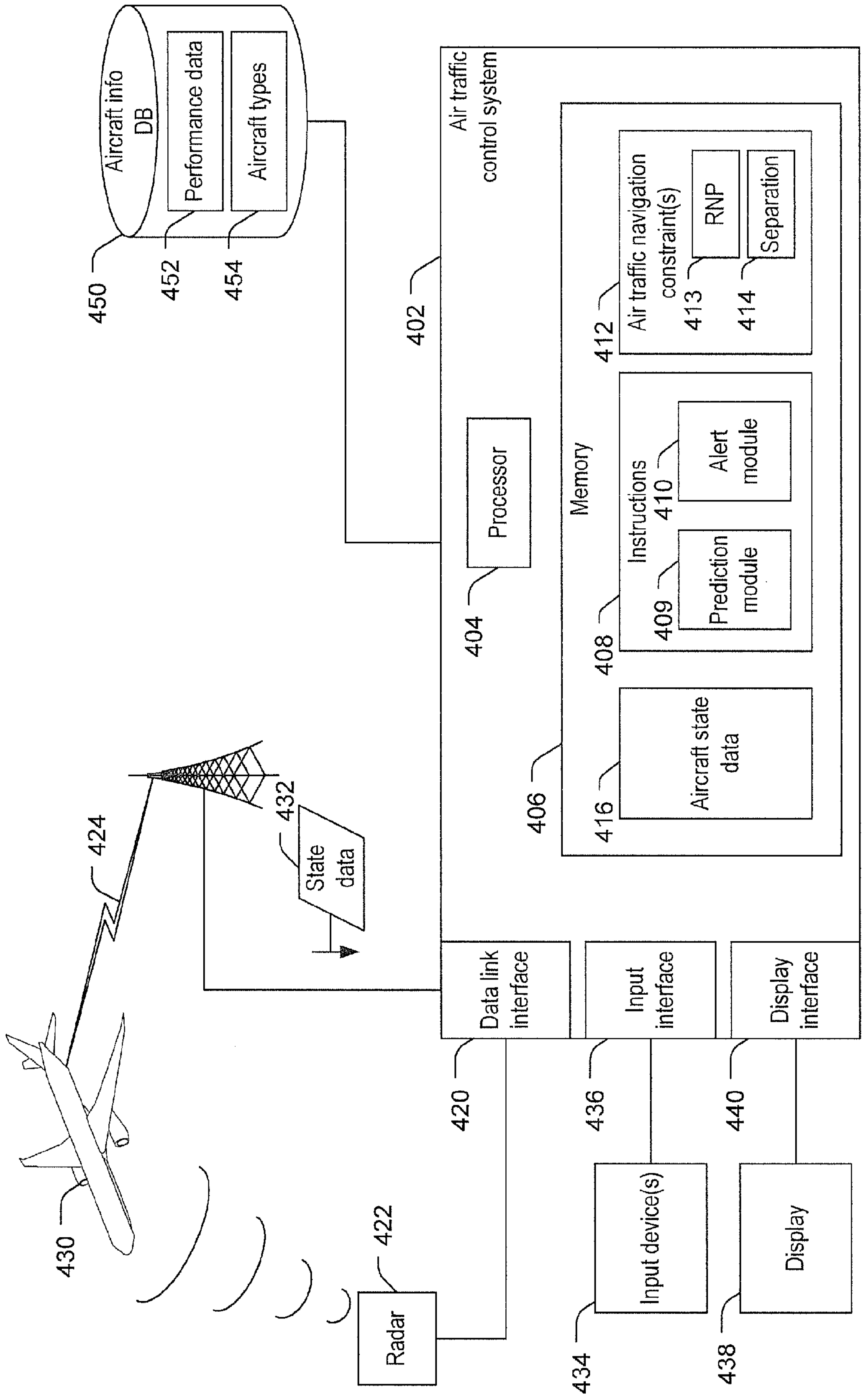
FIG. 4 is block diagram of a particular embodiment of a system for monitoring aircraft path conformance.

FIG. 4 is block diagram of a particular embodiment of a system for monitoring aircraft path conformance. The system includes an air traffic control system 402 that is adapted to communicate with one or more aircraft, such as an aircraft 430, via one or more data links, such as a data link 424, via a data link interface 420. For example, the air traffic control system 402 may receive aircraft state data 432 from the aircraft 430 via the data link 424. The aircraft state data 432 may include information that identifies the aircraft 430, information that identifies a position of the aircraft 430 based on a positioning system of the aircraft 430 (e.g., an inertial navigation system or a Global Positioning Satellite (GPS) system), information that describes a speed or velocity of the aircraft 430, information that describes a course or heading of the aircraft 430, information that describes an orientation of the aircraft 430, information that describes a type of the aircraft 430, other information, or any combination thereof. In an illustrative embodiment, the data link 424 is an Enhanced Surveillance (EHS) link.

The air traffic control system 402 may also be adapted to access or receive information from other computing devices or systems. To illustrate, the air traffic control system 402 can access information by reading the information from a memory device, by receiving the information from one or more sensors, by receiving the information from a computing device, or any combination thereof. For example, the air traffic control system 402 may receive additional data from a radar system 422. The air traffic control system 402 may store date from the radar system 422, the aircraft state data 432, other information descriptive of a state of the aircraft 430, or any combination thereof, at a memory 406 of the air traffic control system 402, as aircraft state data 416.

The air traffic control system 402 may include a processor 404 and the memory 406. The memory 406 may be accessible to the processor 404 and may store instructions 408 that are executable by the processor 404 to cause the processor 404 to perform various functions of the air traffic control system 402. For example, certain functions of the air traffic control system 402 are illustrated in FIG. 4 and described below as performed by a prediction module 409 and an alert module 410. The prediction module 409 and the alert module 410 are described as functional blocks to simplify the description. However, another software architecture (e.g., computer executable instructions stored on a non-transitory computer readable medium) or hardware architecture that perform the functions of the prediction module 409 or the alert module 410, as described below, may be used. To illustrate, application specific integrated circuits adapted to perform one or more functions of the prediction module 409 and/or the alert module 410 may be used.

In a particular embodiment, the prediction module 409 is executable by the processor 404 to predict at least one future position of the aircraft 430 based on the aircraft state data 416. The alert module 410 is executable by the processor 404 to generate an alert when the future position violates or is likely to violate an air traffic navigation constraint 412 associated with the aircraft 430.

The air traffic control system 402 may also include or be in communication with an aircraft information database 450. The aircraft information database 450 may include information related to specific aircraft, such as the aircraft 430, or information related to types or categories of aircraft. For example, the aircraft information database 450 may include performance data 452. The performance data 452 may be associated with particular types 454 of aircraft. For example, certain performance data 452 may be associated with heavy aircraft (e.g., large passenger and cargo aircraft) and other performance data 452 may be associated with light aircraft (e.g., general aviation aircraft). The performance data 452 may include information that describes performance capabilities or characteristics associated with the aircraft types 454. For example, the performance capabilities may include rate limits (i.e., how quickly a parameter can be changed), range limits (e.g., a maximum or minimum value for a particular parameter), or any combination thereof. To illustrate, the performance data 452 may include a roll rate limit indicating a maximum rate of change of a roll parameter. In another example, the performance data 452 may include a pitch rate limit indicating a maximum rate of change of a pitch parameter. In another example, the performance data 452 may include a roll range limit indicating a maximum or minimum roll angle of the aircraft 430. In another example, the performance data 452 may include a pitch range limit indicating a maximum or minimum pitch angle of the aircraft 430.

In operation, the air traffic control system 402 may receive input at an input interface 436 from an input device 434. The input may specify an air traffic navigation constraint 412 that is to apply to the aircraft. For example, the air traffic navigation constraint 412 may include a Required Navigation Performance (RNP) constraint 413, an aircraft separation constraint 414, another navigation constraint, or any combination thereof. The air traffic control system 402 may include the data link interface 420 to receive the aircraft state data 416 via the data link 424, via the radar system 422, or a combination thereof.

The processor 404 of the air traffic control system 402 may execute the prediction module 409 to predict at least one future position of the aircraft 430. The future position of the aircraft 430 may be predicted based on the aircraft state data 416. The prediction module 409 may also access the performance data 452 associated with the aircraft 430 (e.g., based on the aircraft type 454) to predict the future position of the aircraft 430. For example, the prediction module 409 may calculate an expected future path of the aircraft from the detected position based on a velocity of the aircraft 430 and an orientation (e.g., pitch angle, roll angle, or both) of the aircraft 430. The prediction module 409 may also use an estimated delay time to calculate the expected future path. The estimated delay time may correspond to an amount of time that would be used to change the orientation of the aircraft 430 to an orientation that would correct a course deviation of the aircraft 430. To illustrate, when the aircraft 430 is flying straight and level (i.e., no pitch or roll angle), but should turn to satisfy the air traffic navigation constraint 412, the prediction module 409 may estimate how long it will take a pilot to make the turn (e.g., to change the roll angle of the aircraft 430 to a roll angle that accomplishes the turn) based on the performance data 452 associated with the aircraft 430. In another illustrative example, when the aircraft 430 is banked (i.e., has a particular roll angle), but the aircraft 430 should be flying straight to satisfy the air traffic navigation constraint 412, the prediction module 409 may estimate how long it will take a pilot to level the aircraft 430 out (i.e., to change the roll angle of the aircraft 430) based on the performance data 452 associated with the aircraft 430.

The prediction module 409 may also estimate a probability that the aircraft 430 will violate the air traffic navigation constraint 412 based on the expected future path. When the probability that the aircraft 430 will violate the air traffic navigation constraint 412 satisfies a threshold value, the processor 404 may invoke the alert module 410 to generate an alert. The alert may be sent to a display device 438 via a display interface 440. The display device 438 may be associated with the air traffic controller. When the probability that the aircraft 430 will violate the air traffic navigation constraint 412 does not satisfy the threshold value, the alert may not be sent to the display device 438. The alert module 410 or another module including the instructions 408 may also be executable by the processor 404 to send a display that identifies the predicted future position of the aircraft 430 to the display device 438.

Figure 5:
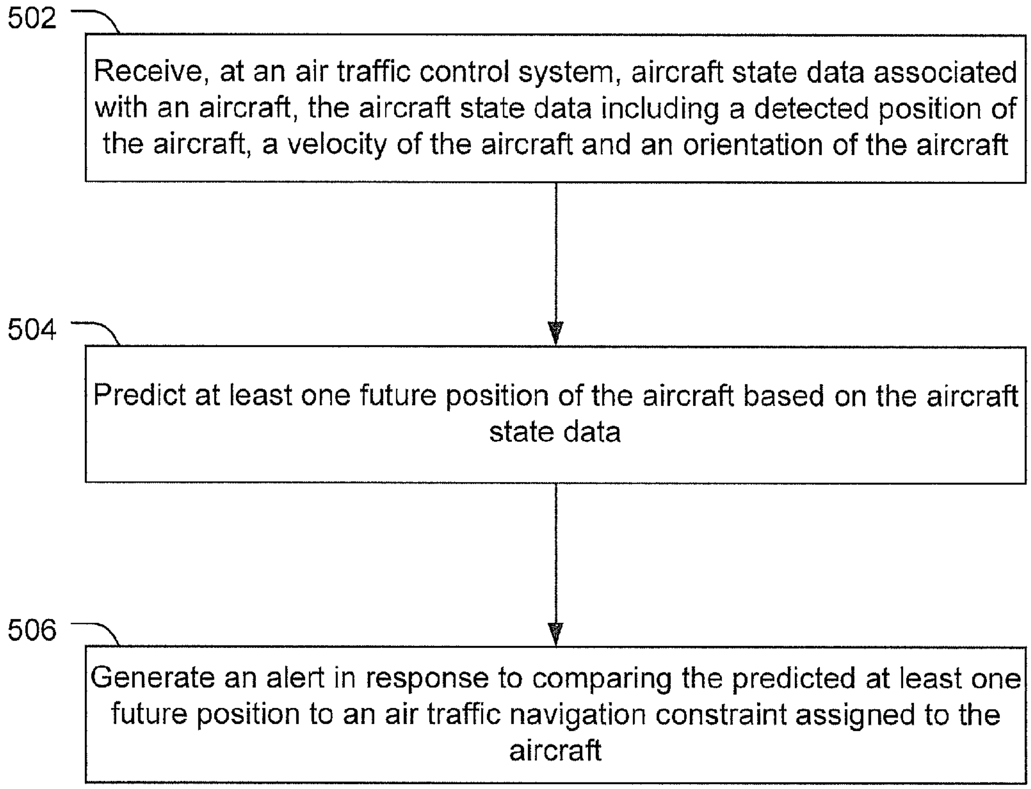
FIG. 5 is flow chart of a first particular embodiment of a method of monitoring aircraft path conformance.

FIG. 5 is flow chart of a first particular embodiment of a method of monitoring aircraft path conformance. The method may be performed by an air traffic control system, such as the air traffic control system 402 of FIG. 4. The method includes, at 502, receiving aircraft state data associated with an aircraft. The aircraft state data may include a detected position of the aircraft, a velocity of the aircraft, an orientation of the aircraft, other information about the state of the aircraft, or any combination thereof. The method may also include, at 504, predicting at least one future position of the aircraft based on the aircraft state data. For example, a predictive estimation technique may be used to predict the future position of the aircraft. The method may further include, at 506, generating an alert in response to comparing the predicted at least one future position to an air traffic navigation constraint assigned to the aircraft. For example, the alert may be generated when the future position of the aircraft violates one of the air traffic navigation constraints 103, 104 of FIG. 1-3.

Figure 6:
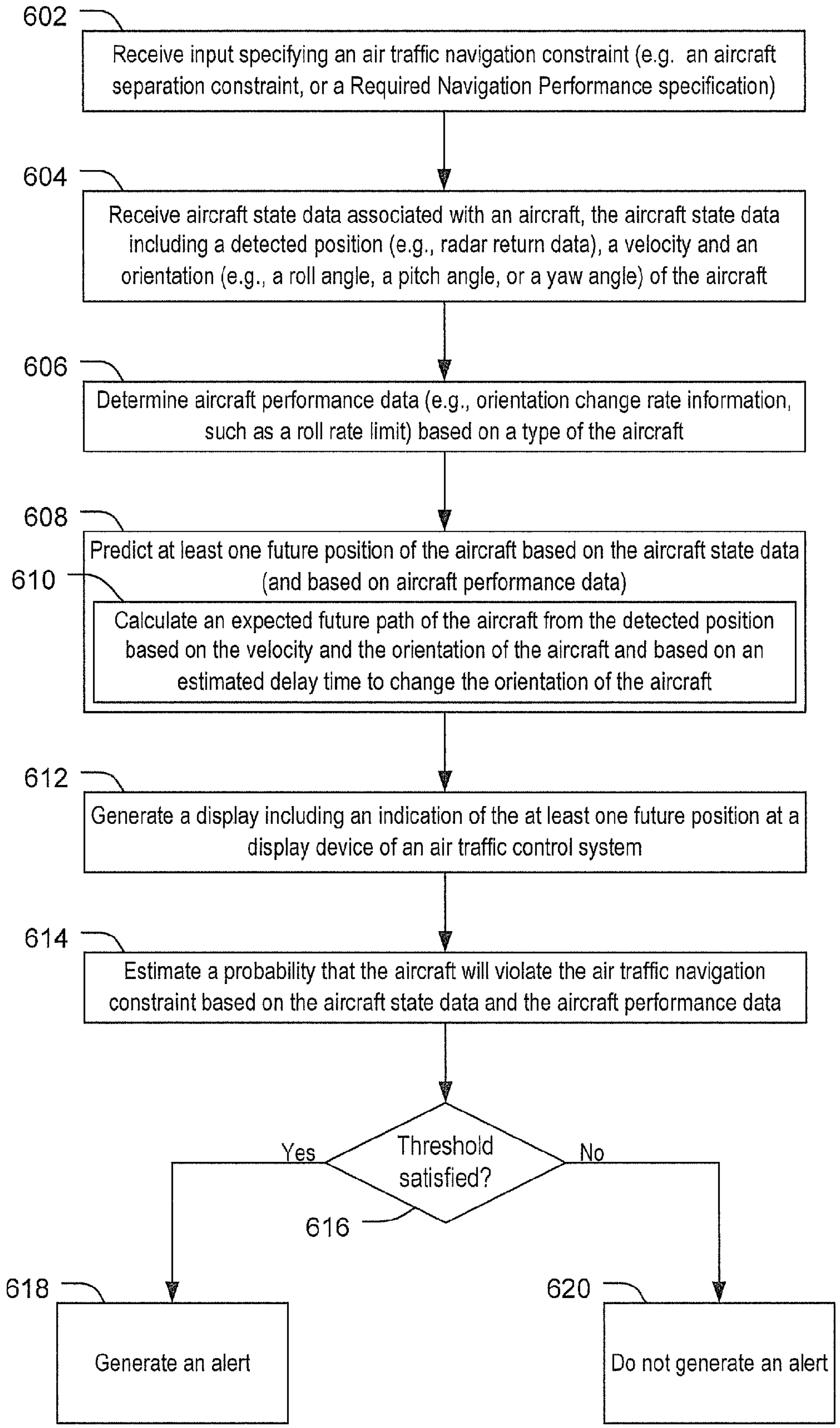
FIG. 6 is flow chart of a second particular embodiment of a method of monitoring aircraft path conformance.

FIG. 6 is flow chart of a second particular embodiment of a method of monitoring aircraft path conformance. The method may be performed by an air traffic control system, such as the air traffic control system 402 of FIG. 4. The method may include, at 602, receiving input specifying an air traffic navigation constraint associated with an aircraft. For example, an air traffic controller may input information indicating that the aircraft is assigned to a particular flight path or to a particular Required Navigation Performance (RNP) path. In another example, the input may be retrieved automatically by the air traffic control system. To illustrate, the air traffic control system may automatically access a particular air traffic navigation constraint for the aircraft from a database based on particular conditions, such as a location of one or more aircraft, weather, detection of an emergency at an airport or onboard an aircraft, characteristics of the aircraft, or any combination thereof. The air traffic navigation constraint may include an aircraft separation constraint, a flight path, an RNP path, other navigation constraints, or any combination thereof.

The method may include, at 604, receiving aircraft state data associated with the aircraft. For example, at least a portion of the aircraft state data may be received via a data link, such as the data link 424 of FIG. 4. In another example, the aircraft state data may be received based on radar return data of a radar system, such as the radar system 422 of FIG. 4. Additionally or in the alternative, the aircraft state data may be received via a radio link to the aircraft, manual input by the air traffic controller, or any combination thereof. The aircraft state data may include a detected position of the aircraft (e.g., based on the radar return data or a positioning system on board the aircraft), a speed or velocity of the aircraft, an orientation of the aircraft (e.g., a roll angle, a pitch angle, or a yaw angle), information identifying a type of the aircraft (e.g., exact type, such as a make and model, or a general category of the aircraft), other state data related to the aircraft, or any combination thereof.

The method may also include, at 606, determining aircraft performance data associated with the aircraft. For example, the aircraft performance data may include orientation change rate information. The orientation change rate information may include a roll rate limit, a pitch rate limit, a yaw rate limit, or another rate limit. In another example, the aircraft performance data may include orientation range information. The orientation range information may include a roll range limit, a pitch range limit, a yaw range limit, or another range limit. The aircraft performance data may also, or in the alternative, include another performance limit associated with the aircraft. In a particular embodiment, the aircraft performance data may be determined based on a type of the aircraft. For example, a database or other memory associated with the air traffic control system may store aircraft performance data associated with specific makes and models of aircraft or associated with aircraft operated by particular aircraft operators. In another example, the database or memory associated with the air traffic control system may store aircraft performance data associated with particular categories of aircraft. To illustrate, heavy aircraft (e.g., large commercial aircraft, such as passenger airline aircraft and cargo aircraft) may be associated with a first set of aircraft performance data, and smaller aircraft (e.g., private or smaller regional airline aircraft) may be associated with a second set of aircraft performance data. The specific categories and type designations associated with each of the aircraft may vary from one implementation to another. For example, in certain embodiments, as few as two aircraft types (e.g., large and small) may be used to differentiate aircraft performance data. However, in other embodiments, each specific aircraft may be associated with a set of aircraft performance data.

The method may include, at 608, predicting at least one future position of the aircraft based on the aircraft state data. For example, a predictive estimation technique may be used to predict the at least one future position of the aircraft. The aircraft performance data may also be used to predict the at least one future position. For example, predicting the future position may include, at 610, calculating an expected future path of the aircraft from the detected position based on the velocity and the orientation of the aircraft and based on an estimated delay time to change the orientation of the aircraft. The estimated delay time may be determined based at least partially on the aircraft performance data. For example, how quickly the aircraft can resume straight flight after a turn may be a function of the velocity of the aircraft as well as a maximum roll rate of the aircraft.

The method may also include, at 612, generating a display at a display device of the air traffic control system. The display may include an indication of the predicted future position. For example, the display may identify the detected position of the aircraft (e.g., based on data from the aircraft or based on radar returns), a previous position of the aircraft, a predicted future position of the aircraft, or any combination thereof. When more than one position of the aircraft is shown, the display may present the positions in a manner that assists the user in identifying which of the positions is an estimate.

The method may include, at 614, estimating a probability that the aircraft will violate the air traffic navigation constraint based on the aircraft state data and the aircraft performance data. For example, the future path of the aircraft may be calculated as described above. Additionally, statistical confidence information associated with the predicted future path may be determined. The future path and the statistical confidence information may be used to determine a likelihood that the aircraft will violate the air traffic navigation constraint. Estimates may be used for certain values in this calculation. The estimated probably that the aircraft will violate the air traffic navigation constraint may be compared to a threshold value. When the threshold value is satisfied, an alert may be generated, at 618. When the threshold value is not satisfied, no alert is generated, at 620. The threshold value may be a configurable value that can be set to reduce incidents of false alarms (i.e., incidents in which an alert is generated but the aircraft does not eventually violate the air traffic navigation constraint). The threshold value may also be selected to ensure that the air traffic controller is alerted as early as possible when the aircraft is likely to violate the air traffic control constraint.

Embodiments disclosed herein may use "nowcast" self-reported data from an aircraft (e.g., via a data link) to calculate future positions of the aircraft. For example, certain embodiments may use detected positions, as well as heading and roll angle state data to predict future positions of the aircraft. Alerts may be generated based on a probability that the aircraft will violate an assigned air traffic navigation constraint. Such path containment-based alerts may be useful for both straight and curved paths.

Predictive monitoring of aircraft positions, as disclosure herein, may enable improved alerting of air traffic controllers. Additionally, predictive monitoring may allow less conservative paths to be assigned to aircraft, leading to reduced air traffic congestion, improved efficiency of approach operations, fuel savings, and improved trajectory predictability.

Figure 7:
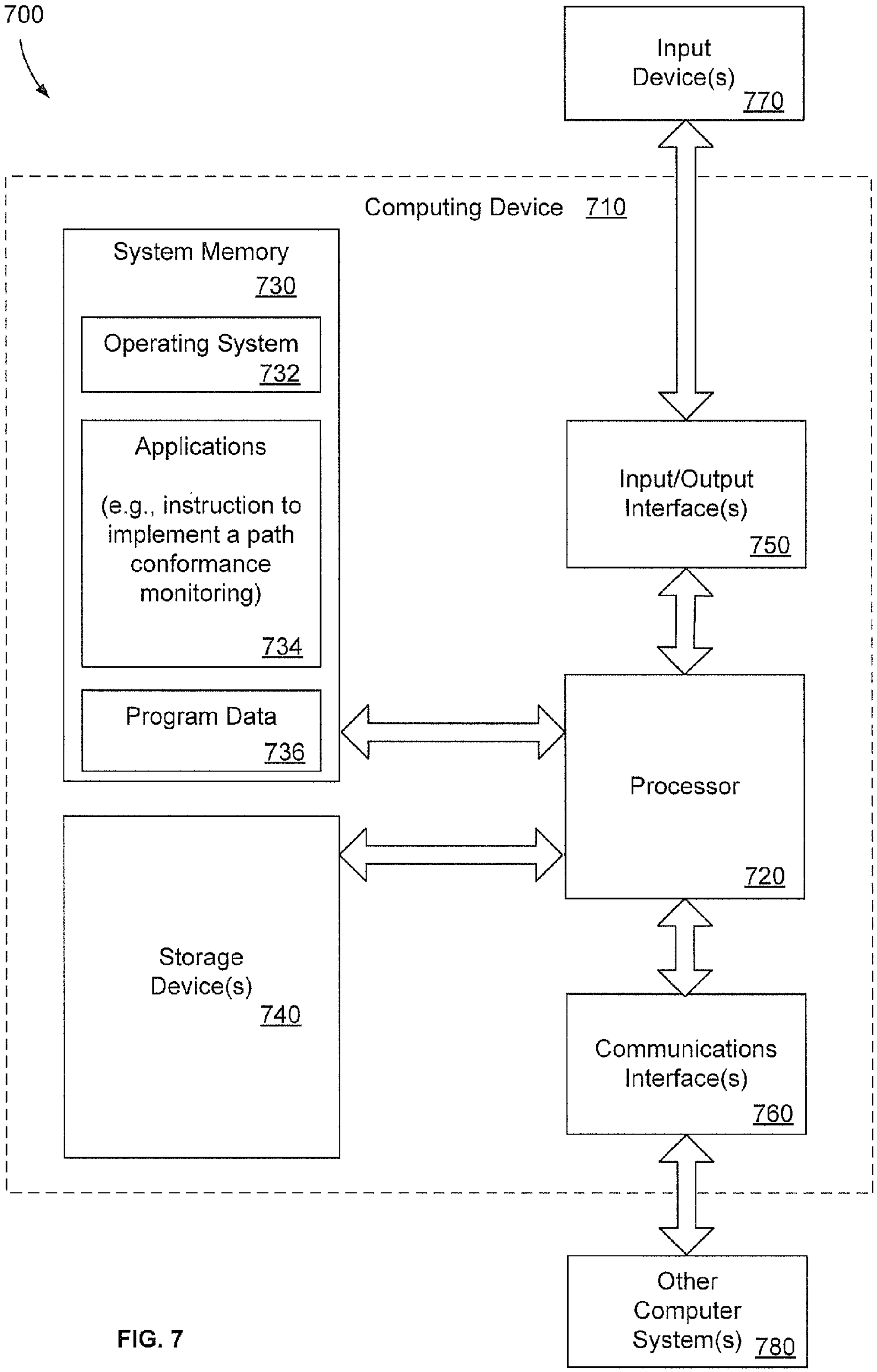
FIG. 7 is block diagram of a computer system adapted to perform a method of monitoring aircraft path conformance according to a particular embodiment.

FIG. 7 is block diagram of a computer system adapted to perform a method of monitoring aircraft path conformance according to a particular embodiment. The computer system 700 may be a portion of a ground-based aircraft monitoring system, such as an air traffic control system. In an illustrative embodiment, a computing device 710 may include at least one processor 720. The processor 720 may be configured to execute instructions to implement a method of aircraft path conformance monitoring. The processor 720 may communicate with a system memory 730, one or more storage devices 740, and one or more input devices 770, such as the input devices 434 of FIG. 4. The processor 720, via one or more receivers or other communications interfaces 760 also may receive aircraft state data (such as the aircraft state data 432 of FIG. 4) or otherwise communicate with one or more other computer systems or other devices.

The system memory 730 may include volatile memory devices, such as random access memory (RAM) devices, and nonvolatile memory devices, such as read-only memory (ROM), programmable read-only memory, and flash memory. The system memory 730 may include an operating system 732, which may include a basic input output system for booting the computing device 710 as well as a full operating system to enable the computing device 710 to interact with users, other programs, and other devices. The system memory 730 may also include one or more application programs 734, such as instructions to implement a method of aircraft path conformance monitoring, as described herein.

The processor 720 also may communicate with one or more storage devices 740. The storage devices 740 may include nonvolatile storage devices, such as magnetic disks, optical disks, or flash memory devices. In an alternative embodiment, the storage devices 740 may be configured to store the operating system 732, the applications 734, the program data 736, or any combination thereof. The processor 720 may communicate with the one or more communication interfaces 760 to enable the computing device 710 to communicate with other computing systems 780.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. An air traffic control system, comprising:

a processor;

a memory accessible to the processor, wherein the memory stores instructions that are executable by the processor to cause the processor to:

access an air traffic navigation constraint assigned to an aircraft;

access aircraft state data associated with the aircraft, the aircraft state data including a detected position of the aircraft, a velocity of the aircraft and an orientation of the aircraft;

access aircraft performance data associated with the aircraft;

predict at least one future position of the aircraft based on the aircraft state data and based on the aircraft performance data, wherein the aircraft performance data comprises roll rate characteristics of the aircraft; and generate an alert when the at least one future position violates the assigned-air traffic navigation constraint.

2. The system of claim 1, further comprising a data link interface to receive information from the aircraft, wherein at least a portion of the aircraft state data is accessed via the data link interface.

3. The system of claim 1, wherein the aircraft performance data includes orientation change rate information associated with the aircraft.

4. The system of claim 1, wherein the instructions are further executable to cause the processor to estimate a probability that the aircraft will violate the air traffic navigation constraint.

5. The system of claim 1, wherein the roll rate characteristics are determined based on a type of the aircraft.

6. The system of claim 1, wherein the orientation of the aircraft comprises a roll angle.

7. The system of claim 1, wherein the orientation of the aircraft comprises a pitch angle.

8. The system of claim 1, wherein the air traffic navigation constraint comprises a Required Navigation Performance path.

9. The system of claim 1, wherein the detected position is determined based on radar return data.

10. The system of claim 1, further comprising a display interface, wherein the alert is sent to a display device via the display interface.

11. The system of claim 1, wherein the instructions are further executable to cause the processor to:

estimate a probability that the aircraft will violate the air traffic navigation constraint based at least partially on the aircraft state data; and generate the alert in response to determining that the probability that the aircraft will violate the air traffic navigation constraint satisfies a threshold value.

12. A method comprising:

receiving, at an air traffic control system, aircraft state data associated with an aircraft, the aircraft state data including a detected position of the aircraft, a velocity of the aircraft and an orientation of the aircraft;

determining a predicted future position of the aircraft based on the aircraft state data and aircraft performance data based on a type of the aircraft, wherein the aircraft performance data includes a roll rate characteristic; and generating an alert in response to comparing the predicted future position to an air traffic navigation constraint assigned to the aircraft.

13. The method of claim 12, further comprising receiving input specifying the air traffic navigation constraint.

14. The method of claim 12, further comprising generating a display at a display device of the air traffic control system, wherein the display includes an indication of the predicted future position.

15. The method of claim 12, further comprising: determining the aircraft performance data based on a type of the aircraft; and estimating a probability that the aircraft will violate the air traffic navigation constraint based on the aircraft state data and the aircraft performance data; wherein the alert is generated in response to determining that the probability that the aircraft will violate the air traffic navigation constraint satisfies a threshold value.

16. The method of claim 15, wherein the alert is not generated when the probability does not satisfy the threshold value.

17. A non-transitory computer-readable medium comprising instructions executable by a processor to cause the processor to:

access an air traffic navigation constraint assigned to an aircraft;

access aircraft state data associated with the aircraft, the aircraft state data including a detected position of the aircraft, a velocity of the aircraft, and an orientation of the aircraft;

access aircraft performance data associated with the aircraft, the aircraft performance data including a roll rate characteristic of the aircraft;

predict at least one future position of the aircraft based on the aircraft state data; and generate an alert in response to comparing the at least one future position to the air traffic navigation constraint assigned to the aircraft.

18. The non-transitory computer-readable medium of claim 17, wherein the air traffic navigation constraint comprises an aircraft separation constraint.

19. The non-transitory computer-readable medium of claim 17, wherein the at least one future position of the aircraft is predicted by calculating an expected future path of the aircraft from the detected position based on the velocity and the orientation of the aircraft and based on an estimated delay time to change the orientation of the aircraft.

20. A non-transitory computer-readable medium comprising instructions executable by a processor to cause the processor to:

access an air traffic navigation constraint assigned to an aircraft;

access aircraft state data associated with the aircraft, the aircraft state data including a detected position of the aircraft, a velocity of the aircraft, and an orientation of the aircraft;

predict at least one future position of the aircraft based on the aircraft state data, wherein the at least one future position of the aircraft is predicted by calculating an expected future path of the aircraft from the detected position based on the velocity and the orientation of the aircraft and based on an estimated delay time to change the orientation of the aircraft;

estimate a probability that the aircraft will violate the air traffic navigation constraint based on the expected future path; and generate an alert in response to comparing the at least one future position to the air traffic navigation constraint assigned to the aircraft, wherein the alert is generated when the probability that the aircraft will violate the air traffic navigation constraint satisfies a threshold value; and wherein the alert is not generated when the probability that the aircraft will violate the air traffic navigation constraint does not satisfy the threshold value.

* * * * *